J. R. GRUNDY.
FLEXIBLE COUPLING.
APPLICATION FILED AUG. 9, 1916.

1,216,227.

Patented Feb. 13, 1917.

Inventor:
John R. Grundy,
by his Attorneys,
Howson & Howson

UNITED STATES PATENT OFFICE.

JOHN R. GRUNDY, OF PHILADELPHIA, PENNSYLVANIA.

FLEXIBLE COUPLING.

1,216,227.  Specification of Letters Patent.  Patented Feb. 13, 1917.

Application filed August 9, 1916. Serial No. 113,946.

*To all whom it may concern:*

Be it known that I, JOHN R. GRUNDY, a citizen of the United States, residing in Philadelphia, Pennsylvania, have invented a Flexible Coupling, of which the following is a specification.

One object of this invention is to provide a relatively simple, inexpensive and yet reliable device for so connecting a driving with a driven shaft as to permit of the successful transmission of power between these members even though they are not accurately in line;—the arrangement of parts being such as to permit either of said members to move longitudinally toward and from the other to a limited extent.

It is further desired to provide a flexible coupling having the above noted characteristics, which may be easily applied to connect a pair of shafts or spindles and which shall not require attention or repair under operating conditions nor be liable to deteriorate with time.

These objects and other advantageous ends I secure as hereinafter set forth, reference being had to the accompanying drawings, in which, Figure 1 is a detached perspective of the parts constituting one form of my invention;

Figure 1:
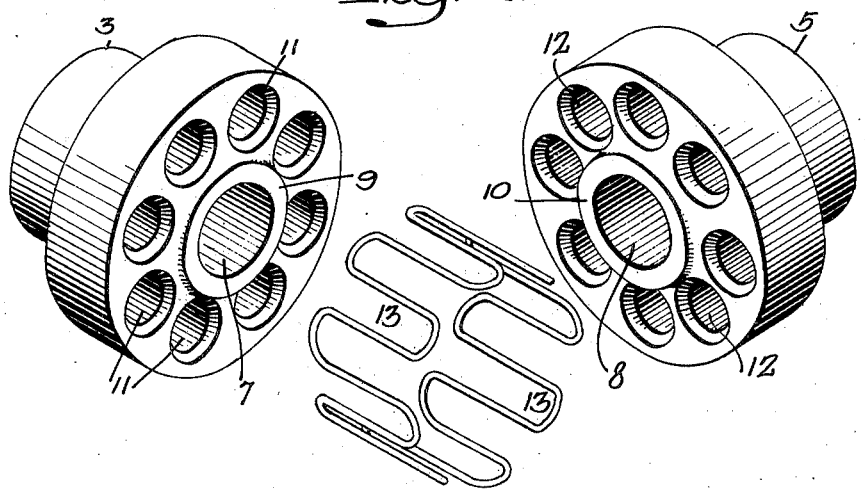
Figure 2:
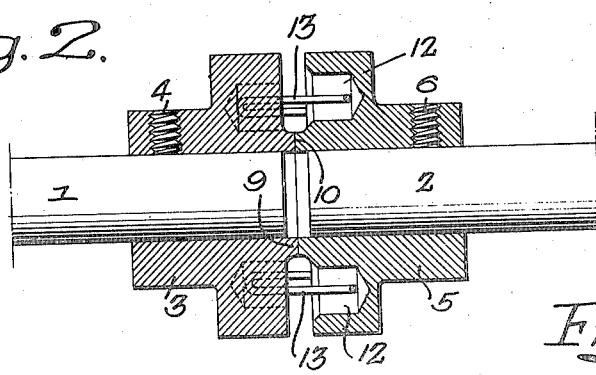
Fig. 2 is a longitudinal section of my flexible coupling.

In the above drawings, 1 and 2 represent two shafts between which it is desired to transmit power and for purposes of my invention the first of these is provided with a flanged collar 3 fixed to it in any desired manner as by a set screw 4. The second shaft 2 is likewise provided with a flanged collar 5 similarly fixed to it by a set screw 6. As shown in Fig. 2 the faces of each of these collars immediately adjacent their central openings 7 and 8 have annular projecting portions 9 and 10 designed to coöperate to maintain their flanges at a definite distance apart.

Concentric with the annular projecting portion 9 and the opening 7 of the collar 3, I provide an annular series of cylindrical holes 11 of such depth that they do not quite extend through the flange. Similarly the flange of the member 5 is provided with a series of holes 12 at the same distance from the center line of the opening 8 as are the holes 11.

For transmitting power between the members 3 and 5 I provide an independent element 13, preferably made of an endless body of spring wire in the form of a circular series of convolutions or U-shaped sections alternately projecting in opposite directions and each of a width equal to or slightly less than the diameter of the holes 11 and 12. The diameter of the imaginary cylinder on whose surface the convolutions of this transmitting member lie is substantially the same as that of the circle including the center lines of all of the holes of both series 11 and 12 and the number of convolutions projecting in either direction is equal to the number of holes in either one series or the other of the flanged collars. As a consequence in assembling the coupling, the band formed by the convolutions of the transmitting member 13 may be entered in the holes 11 of the member 3, one convolution to each hole, thus leaving projecting from the face of said member a series of convolutions which may be entered in the openings 12 of the second member 5.

Figure 3:
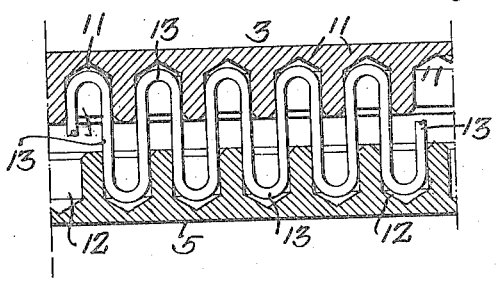
Fig. 3 is a diagrammatic development of portions of the coupling shown in Fig. 1, illustrating the arrangement of certain of the parts.

The holes of the two members 3 and 5 and the power transmitting member 13 occupy the relative positions shown in Fig. 3, so that the center line of each of the holes of said member 3 extends midway between or is staggered with regard to the two adjacent holes 12 of the member 5. At the same time the faces of the members 3 and 5 are spaced apart by the annular projections 9 and 10 as shown in Fig. 2 and power is transmitted from one member to the other through the wire member 13 whose connecting portions lie substantially parallel to the axis of rotation of the two shafts. These latter may however be considerably out of line without interfering with the efficient transmission of power between them and at the same time they are likewise free to move toward and from each other also without affecting the transmission of power between them.

Figure 4:
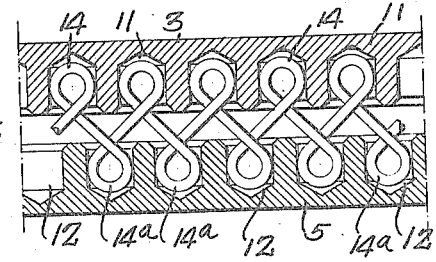
Fig. 4 is a diagrammatic development similar to Fig. 3, but illustrating the use of a modified form of power transmitting element.
Figure 5:
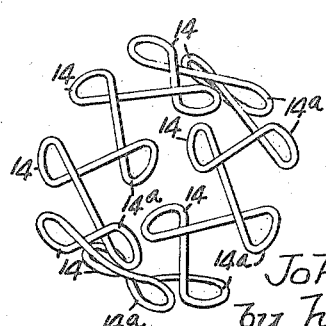
Fig. 5 is a perspective view of the transmitting element shown in Fig. 4.

Instead of forming the power transmitting member 13 of plain U-shaped convolutions, I may make it of relatively stiff spring wire as before, bent to form a series of reversely curved loops 14 and 14ª. These lie alternately at opposite sides of and constitute a cylindrical band, preferably endless, whose diameter is that of the circle in which lie all of the center lines of the holes 11 and 12. Said loops alternately extend into the holes 11 and 12 of the two members 3 and 5 carried by the shafts between which power is to be transmitted, and as shown in Fig. 4 are arranged so that any loop on one side of the band lies approximately midway between or is staggered relatively to two other loops on the opposite side of said band. As before the members 3 and 5 have their faces in which the holes are formed spaced apart and with their shafts are free to move longitudinally of each other to a limited extent while said shafts may be out of line without interfering with the transmission of power.

Obviously the material of which the power transmitting element is made may be of other than circular section without departing from my invention.

I claim:—

1. A flexible coupling consisting of two members; and a power transmitting element consisting of a wire band having convolutions formed to lie substantially within a cylindrical surface and alternately engaging said members.

2. A flexible coupling consisting of two members each having a series of holes therein; and a wire band having convolutions lying substantially within a cylindrical surface and alternately extending into the holes of said members.

3. The combination of a corrugated length of rod material and two members alternately engaged by the corrugations of said length.

4. A coupling consisting of two members each provided with a circular series of holes, the holes in one series being staggered relatively to the holes of the other; with a power transmitting element consisting of a series of laterally flexible members having circularly curved end portions and relatively straight body portions of which said end portions alternately enter the holes of said two members for flexibly connecting the same.

5. A coupling consisting of two members each provided with a circular series of holes, the holes of one series being staggered relatively to the holes of the other; with a power transmitting element alternately entering the holes of said two members and consisting of a series of wire corrugations extending in lines substantially parallel to the axis of revolution of said members.

6. A coupling consisting of two members for connection to a pair of shafts to be coupled, each having a series of holes extended in lines parallel to its axis of revolution; with power transmitting means for connecting said members consisting of integrally connected lengths of wire extending into the holes in lines parallel to the center lines thereof.

7. A coupling consisting of two members for connection to a pair of shafts to be coupled, each having a series of holes extended in lines parallel to the axis of revolution of said members; with power transmitting means for connecting said members consisting of connected lengths of wire loosely entering said holes and extending between said members in lines parallel to the axis of revolution thereof.

8. The combination of two flanged shaft engaging members spaced apart and having a wire band made up of alternated straight and curved portions alternately engaging said flanges.

9. The combination of two flanged shaft engaging members formed with their flanges spaced apart and provided with openings extending in lines parallel to their axis of revolution; with a corrugated wire extending alternately into the openings of the two flanges.

10. The combination of two flanged collars having a projecting portion or portions for spacing their flanges apart, said collars having circular series of holes formed in the flanges thereof in lines parallel to their axis of revolution; with a wire band having straight portions extending into said openings in position to transmit power from one collar to the other while maintaining the collars with the openings of one set staggered relatively to those of the other set, and including also curved portions lying within the openings and connecting said straight portions.

11. A flexible coupling consisting of two members each having a series of recesses extending parallel to its axis of rotation; with a power transmitting structure consisting of a series of mechanically connected laterally flexible elements mounted in said recesses and extending between the members in lines parallel to the lines of the recesses.

12. A flexible coupling consisting of two members each having a series of recesses and arranged with the recesses of one member staggered relatively to those of the other member; with a series of laterally flexible elements extending alternately into the recesses of said members and each engaging the walls of said recesses at two points substantially the same distance from the center line of said members.

13. The combination of two members having substantially parallel faces and each provided with a series of holes extending in lines at right angles to said faces; with a power transmitting structure formed by an elongated body of flexible material extending alternately into the holes of said members and disposed with its length all at substantially the same distance from the axis of rotation of said members.

JOHN R. GRUNDY.